(12) United States Patent
Takahashi (10) Patent No.: US 8,363,343 B2
(45) Date of Patent: Jan. 29, 2013

(54) LENS BARREL HAVING AN ECCENTRICITY ADJUSTING MECHANISM

(75) Inventor: Satoshi Takahashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/208,617

(22) Filed: Aug. 12, 2011

(65) Prior Publication Data

US 2012/0038993 A1 Feb. 16, 2012

(30) Foreign Application Priority Data

Aug. 13, 2010 (JP) .................................. 2010-181436

(51) Int. Cl.
*G02B 7/02* (2006.01)

(52) U.S. Cl. ........................ 359/826; 359/819; 359/822

(58) Field of Classification Search .......... 359/694–704, 359/811–830
See application file for complete search history.

(56) References Cited

U.S. PATENT DOCUMENTS

| 6,204,979 | B1  | 3/2001 | Matsui |
| 7,729,064 | B2* | 6/2010 | Miyazawa et al. ............ 359/819 |
| 2003/0184880 | A1* | 10/2003 | Kawanabe ..................... 359/704 |
| 2004/0207931 | A1  | 10/2004 | Lee |
| 2005/0185295 | A1* | 8/2005 | Makii et al. ................... 359/696 |
| 2006/0045502 | A1  | 3/2006 | Sato |

FOREIGN PATENT DOCUMENTS

| JP | 11-174301 | 7/1999 |
| JP | 2000-066076 | 3/2000 |
| JP | 2000-075182 | 3/2000 |

OTHER PUBLICATIONS

Extended European Search Report issued Dec. 6, 2011 by the European Patent Office in European Patent Application No. 11177319.8, 4 pages.

* cited by examiner

*Primary Examiner* — Mohammed Hasan
(74) *Attorney, Agent, or Firm* — Young & Thompson (57) ABSTRACT

A lens barrel having an eccentricity adjusting mechanism, the lens barrel includes a first lens frame, a second lens frame, an engaging part, a plate spring, a circumferential direction groove, a guiding groove, a screw hole, a set screw, a tool insertion hole. The first lens frame is disposed in an fixed barrel of the lens barrel, integrally holds a plurality of lenses, and has openings on front and rear end of the first lens frame in an optical axis direction. The second lens frame that holds a part of the plurality of lenses to be subjected to eccentricity adjustment and is inserted from one of the openings to be disposed and held in the first lens frame.

6 Claims, 4 Drawing Sheets

LENS BARREL HAVING AN ECCENTRICITY ADJUSTING MECHANISM

CROSS-REFERENCE TO RELATED APPLICATIONS

This application claims the benefit of Japanese Patent Application No. 2010-181436 (filed on Aug. 13, 2010), the entire contents of which are hereby incorporated by reference.

BACKGROUND

1. Technical Field

The present invention relates to a lens barrel including an eccentricity adjusting mechanism, in particular, to a lens barrel including an eccentricity adjusting mechanism for improving optical performance (a resolution level or others) by adjusting a position of a predetermined lens constructing an optical system of the lens barrel in a direction orthogonal to an optical axis.

2. Related Art

Generally, in case of a lens barrel for use in a TV camera or others for broadcasting or business, the adjustment of eccentricity of a lens to increase optical performance such as MTF (resolution) is carried out while the image formation state (image quality) of the lens is observed by a collimator attached onto a leading end of the lens after the lens is fitted into the lens barrel (inside a fixed barrel). The adjustment of eccentricity of a lens is realized by carrying out position adjustment in a direction orthogonal to an optical axis, rotation adjustment around an optical axis, slant angle adjustment, or others.

Conventionally, in order to realize the eccentricity adjustment in the state that lenses are fitted into the barrel, an eccentricity adjusting mechanism enabling the eccentricity adjustment by moving some lenses largely influencing the optical performance by using a tool or the like from the outside of the lens barrel has been suggested.

For example, according to the eccentricity adjusting mechanism of JP-A-2000-66076, some of a lens group having a plurality of lenses integrally held in an outer lens frame are held as lenses to be subjected to eccentricity adjustment in an inner lens frame disposed in the inside of the outer lens frame. The outer lens frame is axially supported by an eccentric pin engaged with the inner lens frame. The eccentric pin is rotated through a hole penetrating from the outside of the barrel to the eccentric pin, thereby adjusting a slant angle of the lenses in the inner lens frame.

According to the eccentricity adjusting mechanism of JP-A-2000-75182, a lens group having a plurality of lenses is held in the outer lens frame, as in JP-A-2000-66076. Some of the lens groups are held as lenses to be subjected to eccentricity adjustment in the inner lens frame. A gear is provided on the circumferential surface of the inner lens frame. The inner lens frame is rotated by a rotating means engaged with the gear through an aperture penetrating from the outside of the barrel to the gear, thereby adjusting rotation of the lenses of the inner lens frame around the optical axis.

According to the eccentricity adjusting mechanism of JP-A-H11-174301, an exposed part is provided in a lens frame holding lenses to be subjected to eccentricity adjustment in the direction orthogonal to the optical axis, and exposed from the outside of the barrel. The exposed part is displaced by an adjustment jig, thereby adjusting the position of the lenses in the direction orthogonal to the optical axis.

However, in case of providing the eccentricity adjusting mechanism for carrying out the eccentricity adjustment by adjusting the position of the lenses in the direction orthogonal to the optical axis, if the eccentricity adjusting mechanism is configured to form the exposed part to be exposed from the outside of the lens barrel in the lens frame of the lenses to be subjected to the eccentricity adjustment as in JP-A-H11-174301, the lens barrel needs to be forwardly and backwardly separable at the position of the lenses in order to insert the exposed part into the barrel and position it therein. In that case, in consideration of the structure of the lens barrel, the lenses to be subjected to the eccentricity adjustment are limited. Accordingly, eccentricity adjustment for lenses other than the lenses largely influencing the optical performance and most suitable for the eccentricity adjustment is carried out, or the structure of the lens barrel should be substantially modified in accordance with the position of the lenses most suitable for eccentricity adjustment.

In case of providing the eccentricity adjusting mechanism for holding an integrated lens group having a plurality of lenses in one lens frame in the state that the lenses are positioned in the optical axis direction with good accuracy, and adjusting the position of some of the lens group to be subjected to the eccentricity adjustment in the direction orthogonal to the optical axis, the mechanism set forth hereinafter may be considered. As in JP-A-2000-66076 and JP-A-2000-75182, among the lens group held in the outer lens frame, lenses to be subjected to the eccentricity adjustment are held by the inner lens frame. Screw holes are provided at a plurality of positions on the outer lens frame in the diameter direction and penetrate up to the inner lens frame. Screws are screwed into the screw holes. A hole is provided on the barrel while penetrating from the outside of the barrel to the screws. Each of the screws of the outer lens frame is rotatably adjusted through the hole from the outside of the barrel, so that the position of the lenses held in the inner lens frame can be adjusted in the direction orthogonal to the optical axis. Since the barrel has to only have the hole for rotatably adjusting the screws of the outer lens frame, even if the lenses largely influencing the optical performance and most suitable for eccentricity adjustment are part of the lens group integrally held in the lens frame, the mechanism for adjusting the eccentricity of the lenses can be easily provided in the lens barrel.

In the case of providing such eccentricity adjusting mechanism, when the eccentricity of the lenses held in the inner lens frame is adjusted, if the position of the optical axis direction or the slant angle of the lenses varies, setting the most optimum state would become difficult. Further, the optical performance may be deteriorated. Accordingly, a regulating means for regulating the inner lens frame to be displaced only in the direction orthogonal to the optical axis is required. The configuration disclosed in JP-A-2000-66076 and JP-A-2000-75182 may also be applied to the regulating means. According to the configuration, an engaging part is provided in the outer lens frame and inwardly projected in the diameter direction. The inner lens frame holding the lenses to be subjected to the eccentricity adjustment is inserted from an aperture (insertion aperture) on one side of the outer lens frame, such that the end of the inserted side of the inner lens frame or the lenses held in the inner lens frame is engaged with the engaging part. Accordingly, separation of the inner lens frame is prevented, and the optical axis direction is positioned. After the insertion of the inner lens frame, a circular elastic member such as a plate spring or rubber is inserted. Thereafter, a pressing ring screw-connected to the inner circumferential surface of the outer lens frame is screwed so that the inner lens frame and the elastic member are fixed in the state that they are sandwiched between the engaging part and the pressing ring. Accordingly, the inner lens frame is pressed toward the engaging part by the elastic member, so that the inner lens frame can be displaced in the direction orthogonal to the optical axis without varying the position of the optical axis direction or the slant angle.

However, the eccentricity adjusting mechanism having the configuration of JP-A-2000-66076 and JP-A-2000-75182 as described above requires the elastic member and the pressing ring. Accordingly, a more simple structure is demanded to reduce the number of components thereby reducing the number of fitting processes and costs.

The present invention has been made in consideration of the circumstances, and its object is to provide a lens barrel having an eccentricity adjusting mechanism for carrying out eccentricity adjustment by displacing some of a lens group having a plurality of lenses integrally held by an outer lens frame in a direction orthogonal to an optical axis, wherein the number of the components for the eccentricity adjusting mechanism is reduced thereby reducing the number of fitting processes and costs.

SUMMARY OF INVENTION

[1] According to an aspect of the present invention, a lens barrel having an eccentricity adjusting mechanism, the lens barrel includes a first lens frame, a second lens frame, an engaging part, a plate spring, a circumferential direction groove, a guiding groove, a screw hole, a set screw, a tool insertion hole. The first lens frame is disposed in an fixed barrel of the lens barrel, integrally holds a plurality of lenses, and has openings on front and rear end of the first lens frame in an optical axis direction. The second lens frame that holds a part of the plurality of lenses to be subjected to eccentricity adjustment and is inserted from one of the openings to be disposed and held in the first lens frame. The engaging part is formed on an inner circumferential face of the first lens frame along a circumferential direction of the inner circumferential face and is inwardly projected in a diameter direction so that an inserted side end of the second lens frame or an inserted side end of the lens held in the second lens frame when the second lens frame is inserted from one of the openings into the first lens frame is engaged with the engaging part in the optical axis direction. The plate spring is mounted in the first lens frame to be in contact with a non-inserted side end of the second lens frame opposite to the inserted side end and press the second lens frame toward the engaging part, the plate spring including a circular part which contacts to the non-inserted side end and a claw part which is outwardly projected in a diameter direction of the circular part from the circular part to be outwardly projected compared to the inner circumferential face of the first lens frame. The circumferential direction groove is formed on the inner circumferential face of the first lens frame along the circumferential direction toward the outside of the diameter direction, and holds the plate spring mounted in the first lens frame in a manner that the claw part of the plate spring is fitted into the circumferential direction groove so that the plate spring is locked in the optical axis direction. The guiding groove is formed at a position connected to a circumferential direction end of the circumferential direction groove on the inner circumferential face of the first lens frame in the optical axis direction, and guides the claw part of the plate spring inserted from the one of the openings of the first lens frame to a position where the claw part of the plate spring is fitted into the circumferential direction groove by rotation around the optical axis. The screw hole penetrates from an outer circumferential face of the first lens frame to the inner circumferential face of the first lens frame at a position of the second lens frame fixed in the first lens frame in the diameter direction. The set screw is screwed into the screw hole to be in contact with an outer circumferential face of the second lens frame and fix the second lens frame to the first lens frame in the direction orthogonal to the optical axis, an eccentricity adjustment for the lens held in the second lens frame is performed by adjusting an insertion amount of the set screw into the screw hole to adjust a fixing position of the second lens frame. The tool insertion hole is formed to penetrate from the outside of the fixed barrel to the screw hole, a tool for adjusting the insertion amount being inserted into the tool insertion hole.

[2] The lens barrel having the eccentricity adjusting mechanism according to [1], wherein the screw hole is formed on at least three positions along the circumferential direction of the first lens frame.

[3] The lens barrel having the eccentricity adjusting mechanism according to [1] or [2], the circumferential direction groove is formed on a position intersecting with a plane surface including the position of the screw hole, among plane surfaces having the optical axis as their end sides.

[4]. The lens barrel having the eccentricity adjusting mechanism according to any one of [1] to [3], the lens group held in the first lens frame is positioned at the insertion opening side compared to the lenses held in the second lens frame, and has an aperture side lens having a larger diameter than the outer circumference of the second lens frame, the opening side lens is held at a position of an enlarged diameter inner circumferential face having an enlarged diameter compared to the inner circumferential face of the second lens frame in which the circumferential direction groove is formed, and the optical axis direction of the opening side lens is positioned by a wall surface of a step-difference portion between the inner circumferential surface, in which the second lens frame is contained and held, and the enlarged diameter inner circumferential face.

[5] The lens barrel having the eccentricity adjusting mechanism according to [4], the opening side lens is held in the first lens frame so that an interval ring is disposed between the opening side lens and the wall face.

[6] The lens barrel having the eccentricity adjusting mechanism according to any one of [1] to [5], wherein the lens group is a rear master lens group among optical systems disposed in the fixed barrel.

According to an aspect of the present invention, it is possible to hold a second lens frame holding lenses to be subjected to eccentricity adjustment among a lens group integrally held in a first lens frame by only using a plate spring, without using separate members from the first lens frame, i.e., the pressing ring and the elastic member, in the conventional technology. Accordingly, the number of components can be reduced, thereby reducing the number of fitting processes and costs.

According to the lens barrel having an eccentricity adjusting mechanism of [2], the screw holes in [1] are formed on at least three positions along the circumferential direction of the first lens frame. The screw holes are formed on at least three positions according to the present invention, so that insertion amounts of set screws screwed into the screw holes are adjusted thereby enabling the adjustment of the position of the lenses of the second lens frame in the direction orthogonal to the optical axis.

According to the lens barrel having an eccentricity adjusting mechanism of [3], the circumferential direction grooves of [1] or [2] are formed at positions overlapping with plane surfaces including the positions of the screw holes, among plane surfaces having the optical axis as their end sides.

According to an aspect of the present invention, an elastic force of a plate spring most effectively prevents the lenses of the second lens frame from being displaced or slanted in the optical axis direction due to the pressing force of the set screws of the screw holes.

According to the lens barrel having an eccentricity adjusting mechanism of [4], the lens group held in the first lens frame of claim [1], [2], or [3] is positioned at the insertion aperture side, compared to the lenses held in the second lens frame, and has an aperture side lens with a larger caliber than the outer circumference of the second lens frame. The aperture side lens is held at a position of a diameter enlarged inner circumferential surface having an enlarged diameter, compared to the inner circumferential surface of the first lens frame, on which the circumferential direction grooves are formed. The optical axis direction is positioned by a wall surface of a step-difference part between the inner circumferential surface containing and holding the second lens frame and the diameter enlarged inner circumferential surface.

According to an aspect of the present invention, in case of holding the lens (aperture side lens) of the first lens frame at the insertion aperture side, compared to the lenses of the second lens frame, the wall surface necessarily formed at the insertion aperture side with respect to the circumferential direction grooves for mounting the plate spring is used as the site for positioning the optical axis direction of the aperture side lens. Accordingly, there is no need to separately provide the site for positioning the aperture side lens.

According to the lens barrel having an eccentricity adjusting mechanism of [5], the aperture side lens of claim [4] is held in the first lens frame by providing an interval ring between the aperture side lens and the wall surface. An embodiment of the present invention relates to providing the interval ring between the aperture side lens and the positioning wall surface, and not contacting the aperture side lens directly with the positioning wall surface.

According to the lens barrel having an eccentricity adjusting mechanism of [6], the lens group in [1], [2], [3], [4], or [5] is a rear master lens group among optical systems disposed in the fixed barrel of the lens barrel. The present invention relates to applying the invention defined in [1] to [5] to the rear master lens group largely influencing optical characteristics of the optical systems.

According to an aspect of the present invention, it is possible to reduce the number of components of the eccentricity adjusting mechanism for carrying out the eccentricity adjustment by displacing some of a lens group having a plurality of lenses integrally held by the outer lens frame in the direction orthogonal to the optical axis, so that reducing the number of fitting processes and costs can be promoted.

DETAILED DESCRIPTION

Hereinafter, an embodiment of the lens barrel having an eccentricity adjusting mechanism according to the present invention will be described with reference to the accompanying drawings.

Figure 1:
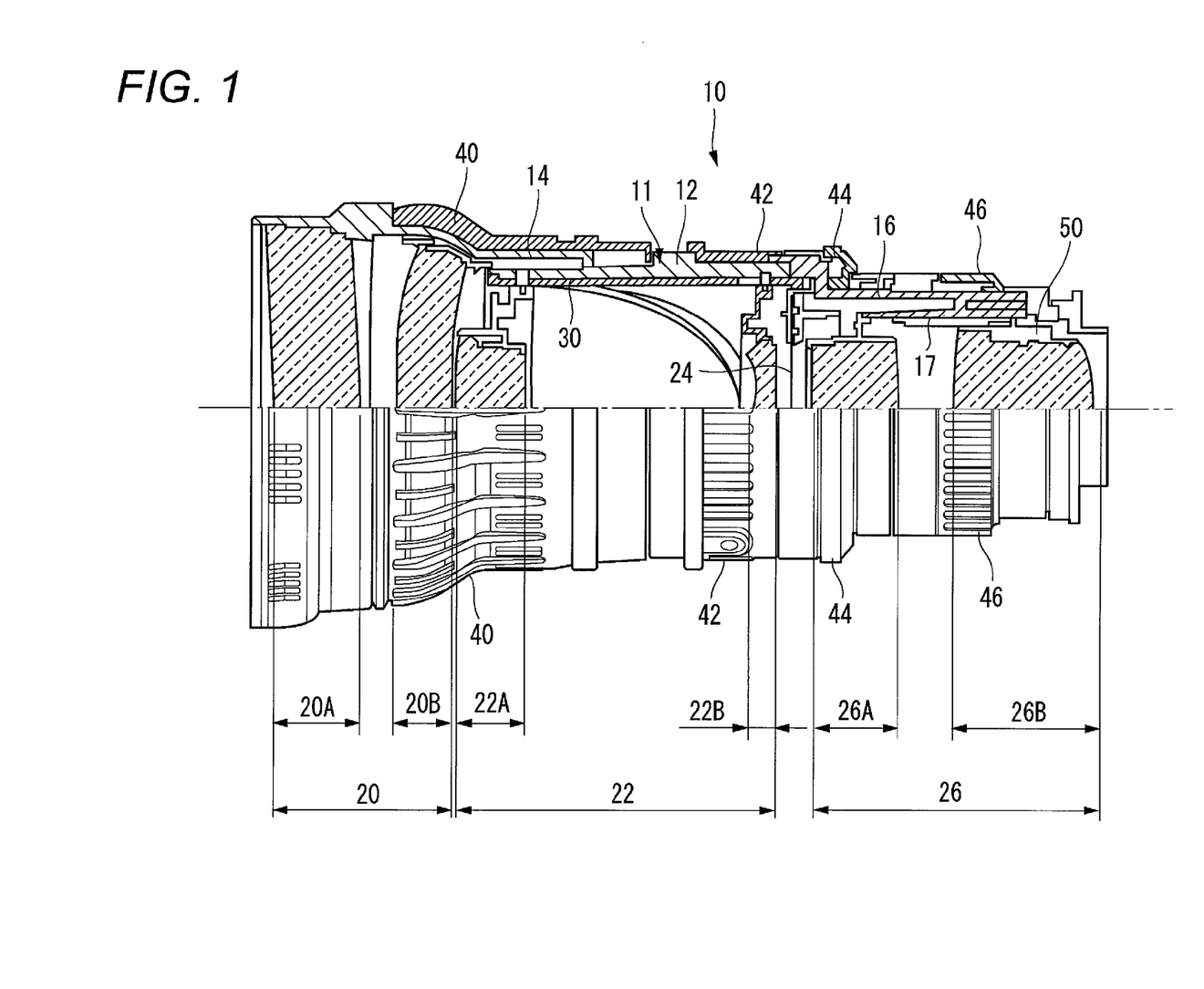
FIG. 1 is a side view showing a partial cross-section of a lens barrel, to which the present invention is applied.

FIG. 1 is a side view showing a partial cross-section of a lens barrel, to which the present invention is applied. The lens barrel 10 of FIG. 1 is an inner focus type of a lens barrel mounted by a mount in an interchangeable lens camera known as an ENG (Electric News Gathering) camera carried to gather news or others for the purpose of broadcasting or business.

The lens barrel 10 has an immovable fixed barrel 11 integrally connected by screws or others to the lens barrel 10. The fixed barrel 11 has a central fixed barrel 12 substantially in the center of the fixed barrel 11, a front fixed barrel 14 fixed to the central fixed barrel 12 and disposed at the front side of the fixed barrel 11, and a rear fixed barrel 16 fixed to the central fixed barrel 12 and disposed at the rear side of the fixed barrel 11.

Optical systems for receiving object light and forming an image are disposed in the fixed barrel 11. As well-known, the optical systems have a focus optical system 20, a zoom optical system 22, an iris 24, and a master optical system 26 in order from the front end side along the optical axis (an object side in the optical axis direction).

The focus optical system 20 is an optical system for adjusting an object distance to adjust a focus, i.e., a focus position (focus adjustment), and includes a fixed focus lens group 20A fixed at a certain position and a moving focus lens group 20B supported to be forwardly and backwardly movable in the optical axis direction. The moving focus lens group 20B moves so that the focus position varies.

The zoom optical system 22 is an optical system for adjusting a zoom ratio, i.e., a focus distance, and includes a ratio conversion system lens group 22A and a correction system lens group 22B, which are supported to be forwardly and backwardly movable in the optical axis direction. The ratio conversion system lens group 22A moves so that the focus distance varies. The correction system lens group 22B moves so that the variation of the focus position due to the movement of the ratio conversion system lens group 22A is suppressed. The ratio conversion system lens group 22A and the correction system lens group 22B cooperatively move in accordance with a position relation predetermined by a cam mechanism of a cam barrel 30.

The iris 24 operates iris blades to be open and closed for adjustment of a light quantity thereby varying an aperture diameter.

The master optical system 26 is an optical system for finally forming an image and includes a front mater lens group 26A and a rear mater lens group 26B. The front master lens group 26A is fixed at a certain position. The rear master lens group 26B is movably supported along the optical axis for adjustment of a back focus or other purposes.

Meanwhile, the fixed barrel 11 has a focus driving mechanism, a zoom driving mechanism, an iris driving mechanism, and a master driving mechanism for driving the movably supported moving focus lens group 20B, the zoom optical system 22 (the ratio conversion system lens group 22A and the correction system lens group 22B), the iris 24, and the rear master lens group 26B, respectively.

Description of details of the driving mechanisms is omitted herein. However, a focus ring 40, a zoom ring 42, an iris ring 44, and a back focus adjusting ring 46 are rotatably disposed on the outer circumferential part of the fixed barrel 11. The focus driving mechanism is configured to enable the moving focus lens group 20B to forwardly and backwardly move in the optical axis direction due to a rotating force of the focus ring 40. The zoom driving mechanism is configured to enable the zoom optical system 22 to forwardly and backwardly move in the optical axis direction due to a rotating force of the zoom ring 42. The iris driving mechanism is configured to enable the iris 24 to be open and closed due to a rotating force of the iris ring 44. The master driving mechanism is configured to enable the rear master lens group 26B to forwardly and backwardly move in the optical axis direction due to a rotating force of the back focus adjusting ring 46.

Hereinafter, the eccentricity adjusting mechanism installed in the lens barrel 10 will be described. The lens barrel 10 has an eccentricity adjusting mechanism for carrying out eccentricity adjustment by adjusting the position of some of the rear master lens group 26B largely influencing the optical performance of all the optical systems in the direction orthogonal to the optical axis.

Figure 2:
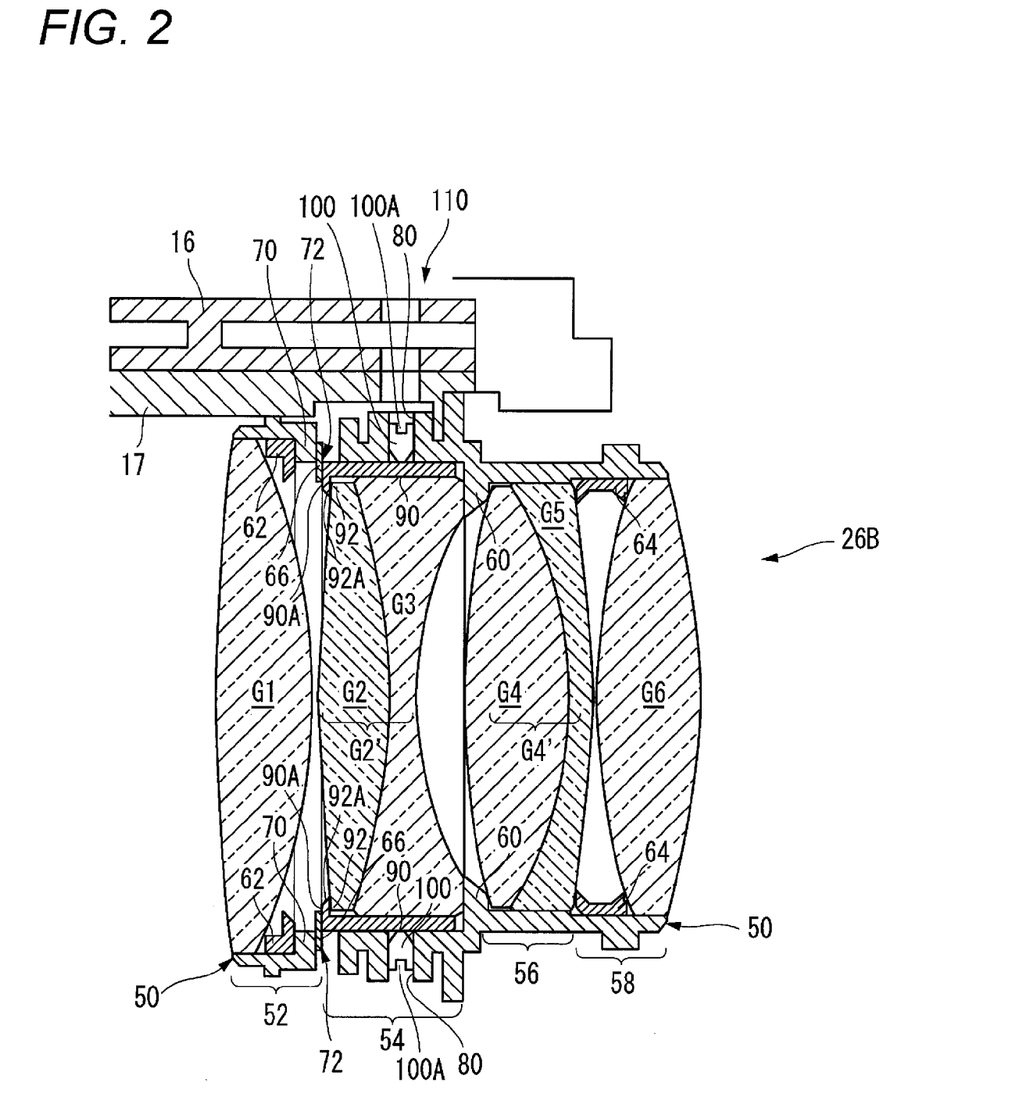
FIG. 2 is an enlarged cross-sectional view showing configuration of the periphery of a rear master lens group.

FIG. 2 is an enlarged cross-sectional view showing configuration of the periphery of the rear master lens group 26B. As illustrated in FIG. 2, the rear master lens group 26B is configured by six lenses (single lenses) G1 to G6. The lenses G2 and G3 are jointed with each other on their facing surface to construct a couple of lenses (doublet lens) G2'. The lenses G4 and G5 are jointed with each other on their facing surface to construct a couple of lenses (doublet lens) G4'.

The lenses G1 to G6 of the rear master lens group 26B are held in the outer lens frame 50 and disposed in the rear fixed barrel 16.

Figure 3:
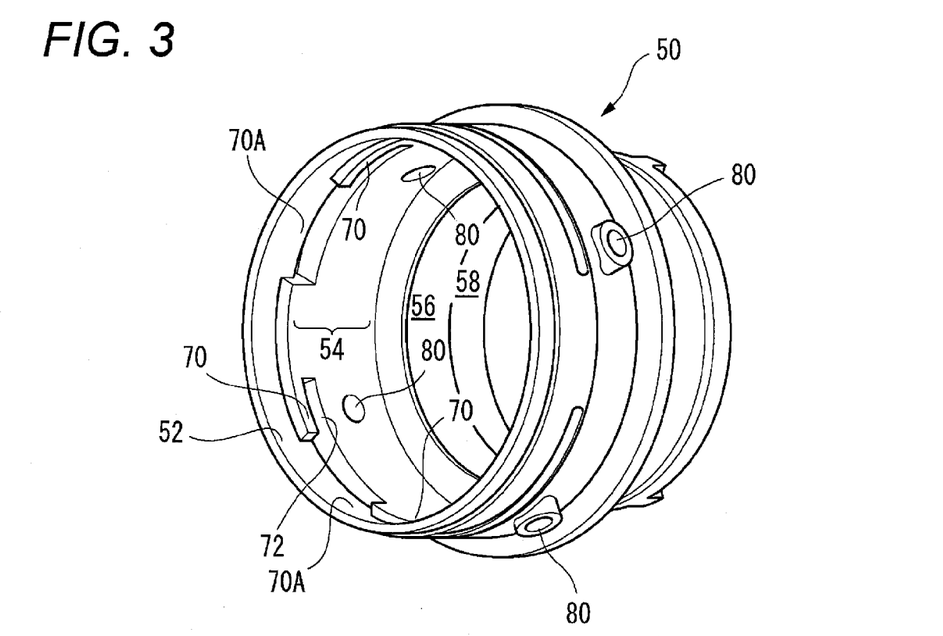
FIG. 3 is a perspective view of an outer lens frame of a rear master lens group.

As illustrated in the perspective view of FIG. 3, the outer lens frame 50 has a first cylinder 52, a second cylinder 54, a third cylinder 56, and a fourth cylinder 58, which have different inner diameters. The first cylinder 52 to the fourth cylinder 58 are disposed in order from the front side. The cylinders 52, 54, 56, and 58 are connected to one another by connection parts connected from the cylinders 52, 54, 56, and 58. The first cylinder 52 to the fourth cylinder 58 are integrally formed, for example, by plastic. An engaging part 60 is provided at the connection part of the second cylinder 54 and the third cylinder 56 of the outer lens frame 50 such that the engaging part 60 is inwardly projected in the diameter direction and formed along the circumferential direction, i.e., in a circular shape. Although description of detailed configuration is omitted herein, the outer circumferential surface of the first cylinder 52 is connected, for example, by screws to the inner circumferential surface of the moving barrel 17 disposed in the rear fixed barrel 16. The moving barrel 17 forwardly and backwardly moves in the optical axis direction due to the rotation of the back focus adjusting ring 46 so that the outer lens frame 50 also forwardly and backwardly moves in the optical axis direction.

As illustrated in FIG. 2, the first cylinder 52 has the largest inner diameter, and the lens G1 is held in the first cylinder 52. The second cylinder 54 at the rear end of the first cylinder 52 has a smaller inner diameter than that of the first cylinder 52. The inner lens frame 90 is held in the second cylinder 54, and the lens G2' (G2 and G3) held in the inner lens frame 90 is disposed in the second cylinder 54. The third cylinder 56 at the rear end of the second cylinder 54 has the smallest inner diameter, and the lens G4' (G4 and G5) is held in the third cylinder 56. The fourth cylinder 58 at the rear end of the third cylinder 56 has a larger inner diameter than that of the third cylinder 56, and the lens G6 is held in the fourth cylinder 58.

Since the lens G2' disposed in the second cylinder 54 largely influences the optical performance of all the optical systems in the lens barrel 10, the lens G2' is configured to be subjected to eccentricity adjustment. The lens G2' is disposed in the second cylinder 54 in the state that it is held in the inner lens frame 90, namely, the outer circumferential part of the lens G2' is surrounded by the inner lens frame 90.

The inner lens frame 90 is in a cylindrical form. The outer circumferential surface of the inner lens frame 90 has a slightly smaller diameter than the inner circumferential surface of the second cylinder 54 of the outer lens frame 50. As described hereafter, since the inner lens frame 90 is pressed from the outer circumferential surface in the diameter direction, the inner lens frame 90 is displaced in the direction orthogonal to the optical axis in the outer lens frame 50 (the inside of the second cylinder 54) and fixed at a desired position. The inner lens frame 90 is made of hard materials such as metal to prevent distortion of the lens G2' resulting from the pressing force.

An engaging part 92 is formed at the front end part of the inner lens frame 90 such that the engaging part 92 is inwardly projected in the diameter direction to engage the front side edge (the circumferential part of the front surface) of the lens G2'.

The order to fit the lenses G1 to G6 of the rear master lens group 26B into the outer lens frame 50 will be described. First, the lens G2' is inserted from the rear aperture of the inner lens frame 90 and contained in the inner lens frame 90 in the state that the front side edge of the lens G2' is engaged with the engaging part 92. Thereafter, the lens G2' is inserted from the front aperture of the outer lens frame 50 together with the inner lens frame 90. The lens G2' enters up to the position of the second cylinder 54. The rear side edge (the circumferential part of the rear surface) of the lens G2' comes in contact with the front surface of the engaging part 60 projected in the outer lens frame 50. The lens G2' is contained in the second cylinder 54 in the state that the lens G2' is positioned by the engaging part 60 in the optical axis direction. Thereafter, the plate spring 66 is inserted into and mounted in the outer lens frame 50 to hold the lens G2' and the inner lens frame 90 in the second cylinder 54 while backwardly pressing the lens G2' and the inner lens frame 90. Details of the plate spring 66 will be described hereafter. Instead of the rear side edge of the lens G2', the rear end part of the inner lens frame 90 may come in contact with the front surface of the engaging part 60. However, contacting the rear side edge of the lens G2' directly with the engaging part 60 increases the accuracy for positioning the lens G2' and thus is preferable.

Subsequently, the interval ring 62 and the lens G1 illustrated in FIG. 2 are inserted in order from the front aperture of the outer lens frame 50. The rear surface side of the interval ring 62 comes in contact with a front surface of a pressing part 70 (details thereof will be described hereafter) provided on the inner circumferential part of the first cylinder 52 while being inwardly projected in the diameter direction. Accordingly, the front surface side of the interval ring 62 comes in contact with the rear side edge of the lens G1. The lens G1 is contained in the first cylinder 52 in the state that the lens G1 is positioned at a predetermined position apart from the front surface of the pressing part 70 with a predetermined distance in the optical axis direction. Meanwhile, the interval ring 62 is not necessarily required. The lens G1 may be positioned by contacting the rear side edge of the lens G1 directly with the front surface of the pressing part 70. The front side edge of the lens G1 is fixed to the front end part of the outer lens frame 50 (the first cylinder 52) by an adhesive means such as thermal caulking, so that the lens G1 is held in the first cylinder 52.

The lens G4' (lens G4 and G5) and the lens G6 are inserted from the rear aperture of the outer lens frame 50. The lens G4 is first inserted into the outer lens frame 50. The front side edge of the lens G4' comes in contact with the rear surface of the engaging part 60. The lens G4' is contained in the third cylinder 56 in the state that the lens G4' is positioned by the engaging part 60 in the optical axis direction. Subsequently, the interval ring 64 illustrated in FIG. 2 is inserted, and then the lens G6 is inserted. The front surface of the interval ring 64 comes in contact with the rear side edge of the lens G4'. The rear surface of the interval ring 64 comes in contact with the front side edge of the lens G6. Accordingly, the lens G6 is contained in the fourth fixed barrel 58 in the state that the lens G6 is positioned at a predetermined position apart from the rear surface of the engaging part 60 with a predetermined distance in the optical axis direction. The rear side edge of the lens G6 is fixed to the rear end part of the outer lens frame 50 (the fourth cylinder 58) by an adhesive means such as thermal caulking, so that the lens G4' is held in the third cylinder 56, and the lens G6 is held in the fourth cylinder 58.

On the inner circumferential surface of the first cylinder 52 of the outer lens frame 50, in which the rear master lens group 26B is fitted as described above, the pressing part 70 is provided along the circumferential direction while being inwardly projected in the diameter direction. Since the inner circumferential surface of the pressing part 70 is connected to the inner circumferential surface of the second cylinder 54, the pressing part 70 may be regarded as part of the second cylinder 54.

The pressing part 70 has the same function as that of a conventional pressing ring. The conventional pressing ring engages an elastic member such as a corrugated plate spring disposed at the front side of the inner lens frame 90 by means of a circular member having a smaller inner diameter than an outer diameter of the inner lens frame 90, and presses the inner lens frame 90 and the lens G2' toward the engaging part 60 at the rear side of the inner lens frame 90 through the pressing force of the elastic member.

Unlike the conventional pressing ring, the pressing part 70 of the present embodiment has a larger inner diameter (the same inner diameter as the second cylinder 54) than the outer diameter of the inner lens frame 90 to not obstruct the insertion of the inner lens frame 90 and the lens G2' into the second cylinder 54 of the inner lens frame 90. The pressing part 70 is not separate from and is integrally formed with the outer lens frame 50. A circular plate spring 66 corresponding to a conventional elastic member is mounted and held at the rear side of the pressing part 70.

Figure 4:
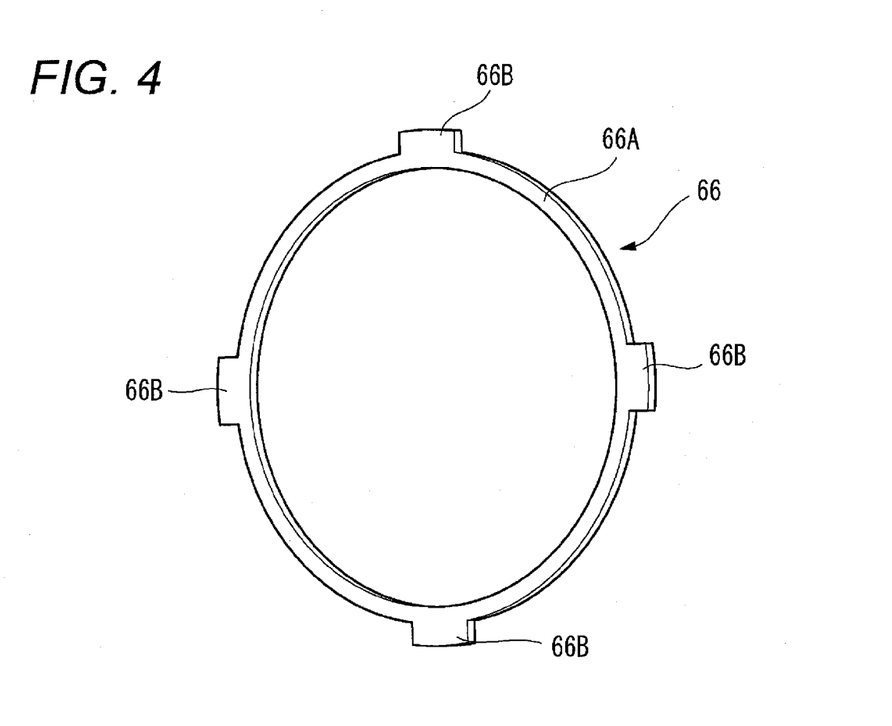
FIG. 4 is a perspective view showing a shape of a plate spring.

FIG. 4 is a perspective view showing the shape of the plate spring 66. As illustrated in FIG. 4, the plate spring 66 has a circular part 66A and claw parts 66B outwardly projected in the diameter direction at four positions with equal angle intervals (90° intervals) on the outer circumferential part of the circular part 66A. The outer diameter of the circular part 66A is substantially the same as the inner diameter of the second cylinder 54. The outer diameter of the claw parts 66B (the diameter of the circle along the outer circumference of the four claw parts 66B) is substantially the same as the inner diameter of the first cylinder 52.

Circumferential direction groves 72 are formed at four positions (facing positions in the upward and downward direction, and facing positions in the left and right direction when viewed from the front side) with equal angle intervals (90° intervals) on the rear side of the pressing part 70, such that the four claw parts 66B of the plate spring 66 are simultaneously fitted into the grooves 72 thereby mounting and holding the plate spring 66.

Insertion parts (guiding grooves) 70A are formed at four positions with equal angle intervals (90° intervals) on the pressing part 70 to insert (guide) the claw parts 66B of the plate spring 66 inserted from the front aperture of the outer lens frame 50 up to the end positions of the grooves 72 in the circumferential direction. In other words, the pressing part 70 has projections, which are intermittently projected at four positions with equal angle intervals (90° intervals) on the front sides of the grooves 72 along the circumferential direction. The positions where no projections are formed are the insertion parts 70A.

Meanwhile, when the outer lens frame 50 is injection molded, the grooves 72 are undercut. Accordingly, the grooves 72 can move in the diameter direction (the direction orthogonal to the optical axis) of the outer lens frame 50 with respect to a mold core movable in the optical axis direction of the outer lens frame 50, and is molded by a slide core outwardly drawn in the diameter direction. Accordingly, the grooves 72 are formed by an elongated hole penetrating up to the outer circumferential surface of the outer lens frame 50.

Figure 5:
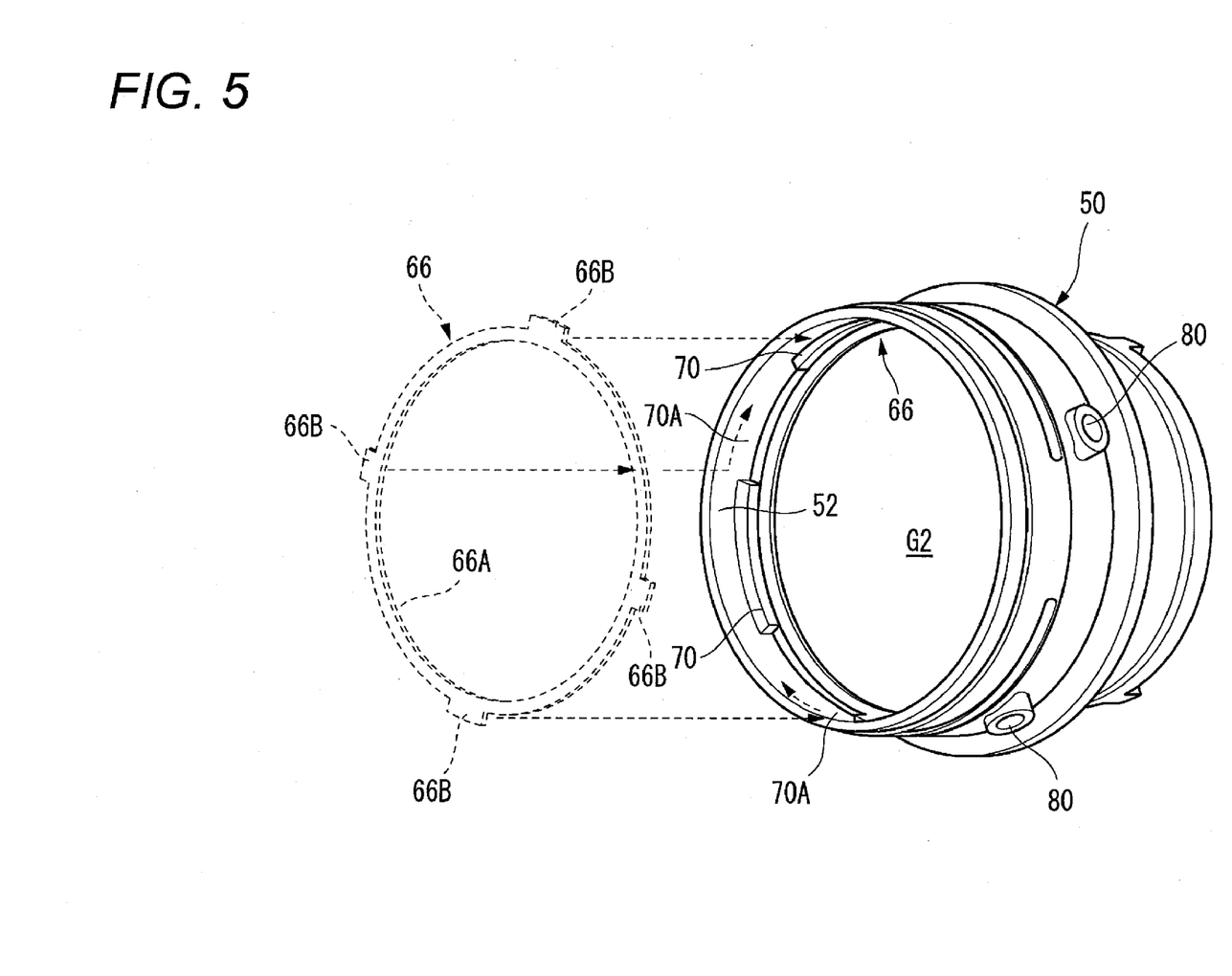
FIG. 5 is a view for explanation of the order to mount a plate spring in an outer lens frame.

According to the configuration that has been described, the plate spring 66 can be mounted in the outer lens frame 50 as set forth hereinafter. With reference to FIG. 5, as described above, the inner lens frame 90 and the lens G2' held therein are first inserted from the front aperture of the outer lens frame 50, and contained in the second cylinder 54. Subsequently, the plate spring 66 is inserted from the front aperture of the outer lens frame 50. The claw parts 66B of the plate spring 66 pass the insertion parts 70A of the pressing part 70, respectively, to enter up to the positions where the grooves 72 are provided. The plate spring 66 is rotated in a predetermined direction (a clockwise direction when viewed at the front side) along the circumferential direction, so that the claw parts 66B of the plate spring 66 are fitted into the grooves 72, respectively, and held in the state that the claw parts 66B are engaged by the pressing part 70 in the optical axis direction.

Once the plate spring 66 is mounted as described above, the rear surface of the circular part 66A of the plate spring 66 comes in contact with a front end surface 90A formed at the front end part of the inner lens frame 90 and orthogonal to the optical axis. The front end surface 90A of the inner lens frame 90 is engaged with the plate spring 66 in the optical axis direction. Accordingly, the inner lens frame 90 and the lens G2' are held in the second cylinder 54. In this case, the plate spring 66 is elastically transformed in the state that the circular part 66A and the claw parts 66B are distorted toward the front side and the rear side, respectively. Due to the elastic force, the inner lens frame 90 and the lens G2 are backwardly pressed, so that the rear side end (the rear end surface in the direction orthogonal to the optical axis) of the lens G2' in the inner lens frame 90 is always pressed on the front surface of the engaging part 60. In this state, the optical axis direction of the lens G2' is positioned by the front surface of the engaging part 60.

According to the structure wherein the plate spring 66 is mounted in the outer lens frame 50 to hold the inner lens frame 90 and the lens G2', the two components separate from the outer lens frame 50 in the conventional technology, i.e., the pressing ring and the elastic member, are not required. Accordingly, the number of components can be reduced, thereby reducing the number of fitting processes.

As described above, the front surface of the pressing part 70 also functions as a wall surface for positioning the optical axis direction of the lens G1 held at the front side of the lens G2' of the inner lens frame 90. Conventionally, since the position where the pressing ring separate from the first lens frame 50 is fixed is not determined, the lens G1 has been positioned based on other fixed sites instead of the pressing ring. However, the pressing part 70 of the present embodiment has the function for positioning the lens G1. Accordingly, there is no need to provide a component for positioning the lens G1 at a different position from the pressing part 70, so that optical design to reduce the interval between the lens G1 and the lens G2' can be realized. Such optical design contributes to miniaturization of the lens barrel 10 and simplifies the configuration thereby reducing costs.

The screw holes 80 are formed at four positions with equal angle intervals (90° intervals) on the second cylinder 54 of the outer lens frame 50 and penetrate the second cylinder 54 in the diameter direction. The set screws 100, for example, processed to have flat leading ends and pointed ends are screwed into the screw holes 80, so that the leading ends of the set screws 100 are pressed on the outer circumferential surface of the inner lens frame 90.

With this configuration, one of the set screws 100 screwed into the two facing screw holes 80 is released, and the other set screw 100 is tightened to adjust an insertion amount of each of the set screws 100 into the screw holes 80, so that the inner lens frame 90 can be displaced in the direction orthogonal to the optical axis (upward and downward direction and left and right direction). Accordingly, by adjusting the position of the lens G2' held in the inner lens frame 90 in the direction orthogonal to the optical axis, the eccentricity adjustment can be carried out. Since the inner lens frame 90 is backwardly pressed by the plate spring 66, the position of the optical axis direction of the lens G2' does not change, and the inner lens frame 90 is held in the state that it is positioned by the engaging part 60 in the optical axis direction. Since the inner lens frame 90 is made of hard materials such as metal, distortion of the lens G2' when large pressure is applied to the inner lens frame 90 by the set screws 100 is prevented.

The grooves 72 for holding the claw parts 66B of the plate spring 66 are formed at positions overlapping with the optical axis direction with respect to each of the screw holes 80 provided on the second cylinder 54 of the outer lens frame 50, i.e., positions intersecting with the plane surfaces including the positions of the screw holes 80 among the plane surfaces having the optical axis as their end sides. Accordingly, the force for backwardly pressing the inner lens frame 90 through the plate spring 66 is the largest at the positions where the set screws 100 are in contact with the inner lens frame 90. Accordingly, when the set screws 100 are tightened or other cases, even if a force for forwardly pressing the inner lens frame 90 is applied, the rear side edge of the lens G2' is prevented from being spaced from the front surface of the engaging part 60.

The set screws 100 have grooves 100A, into which the end of the minus driver is inserted. On the moving barrel 17 or the rear fixed barrel 16 disposed on the outer circumferential part of the outer lens frame 50, a penetration hole 110 penetrating from the outside of the barrel to the screw holes 80 in the diameter direction is provided. Accordingly, after the lens barrel 10 is assembled, the minus driver is inserted into the penetration hole 110 from the outside of the lens barrel 10 so that the end of the minus driver is inserted into the grooves 100A of the set crews 100 thereby rotating the set screws 100. Insertion amounts (tightened state) of the set screws 100 at the four positions are adjusted thereby adjusting the position of the lens G2' in the direction orthogonal to the optical axis so that the eccentricity adjustment can be carried out to realize the most optimum optical performance. Meanwhile, if one or a plurality of members, other than the moving barrel 17 and the rear fixed barrel 16, are disposed at the positions corresponding to the screw holes 80 in the diameter direction, the members preferably have holes penetrating up to the respective screw holes 80, so that the driver can be inserted from the outside up to the positions of the set screws 100. If the members can be easily separated from the rear fixing barrel 16, they do not need to have the holes. The members may be separated upon the eccentricity adjustment.

In the embodiment that has been described, the pressing parts 70 at the front sides of the grooves 72 for mounting the plate spring 66 are projected on the inner circumferential surface of the first cylinder 52. However, the pressing parts 70 have such configuration for comparison with a conventional pressing ring. Actually, when the grooves 72 and the insertion parts 70A are formed on the inner circumferential surface of the second cylinder 54, in which the inner lens frame 90 is held, the pressing rings 70 are necessarily formed at the front sides of the grooves 72 as part of the second cylinder 54. Accordingly, there is no need to intentionally form the pressing parts 70 as components for mounting the plate spring 66. In other words, in the foregoing descriptions, the pressing parts 70 are projected on the inner circumferential surface of the diameter enlarged front side (the inner circumferential surface of the first cylinder 52), compared to the inner circumferential surface of the position where the inner lens frame 90 is contained and held (the inner circumferential surface of the second cylinder 54). However, the diameter enlarged inner circumferential surface, on which the pressing parts 70 are projected, is unnecessary. Accordingly, even in the case where the inner lens frame 90 is contained and held at the position closest to the apertures in the outer lens frame 50, and no lenses are held at the front side of the lenses of the inner lens frame 90, i.e., there is no diameter enlarged inner circumferential surface at the front side of the inner circumferential surface, in which the inner lens frame 90 is contained and held, the structure for mounting the plate spring 66 in the embodiment that has been described can be applied.

In the embodiment that has been described, the screw holes 80, into which the set screws 100 are screwed, are formed at four positions along the circumferential direction of the outer lens frame 50. However, the set screws 100 are preferably formed on at least three positions. The claw parts 66B of the plate spring 66 and the grooves 72, into which the claw parts 66B are fitted, are preferably formed on at least two positions. However, for example, the number of the claw parts 66B and the grooves 72 is preferably more than the number of the screw holes 80. The grooves 72 are preferably formed at the positions intersecting with at least the plane surfaces including the positions of the screw holes 80 among the plane surfaces having the optical axis as their end sides.

In the embodiment that has been described, the structure for containing and holding the inner lens frame 90 in the outer lens frame 50 may be reversed.

The embodiment that has been described describes the eccentricity adjusting mechanism for carrying out eccentricity adjustment for some of the rear mater lens group 26B. However, the configuration in the embodiment can be applied to carrying out eccentricity adjustment for some of other lens groups. Instead of the lens barrel used for an ENG camera according to the embodiment, other types of lens barrels may be used.

10 lens barrel
11 fixed barrel
12 central fixed barrel
14 front fixed barrel
16 rear fixed barrel
17 moving barrel
20 focus optical system
22 zoom optical system
24 iris
26 master optical system 20A fixed focus lens group
20B moving focus lens group
22A ratio conversion system lens group
22B correction system lens group
26A front master lens group
26B rear master lens group
30 cam barrel
30 A, 30 B cam grooves
30C screw hole
40 focus ring
42 zoom ring
44 iris ring
46 back focus adjusting ring
50 outer lens frame
52 first cylinder
54 second cylinder
56 third cylinder
58 fourth cylinder
60 engaging part
62, 64 interval ring
66 plate spring
66A circular part
66B claw part
70 pressing part
70A insertion part
72 groove
80 screw hole
90 inner lens frame
90A front end surface
92 engaging part
100 set screw
100A groove
110 penetration hole
G1 to G6, G2', G4' lenses

What is claimed is:

1. A lens barrel having an eccentricity adjusting mechanism, the lens barrel comprising:
   a first lens frame that is disposed in an fixed barrel of the lens barrel, integrally holds a plurality of lenses, and has openings on front and rear end of the first lens frame in an optical axis direction;
   a second lens frame that holds a part of the plurality of lenses to be subjected to eccentricity adjustment and is inserted from one of the openings to be disposed and held in the first lens frame;
   an engaging part that is formed on an inner circumferential face of the first lens frame along a circumferential direction of the inner circumferential face and is inwardly projected in a diameter direction so that an inserted side end of the second lens frame or an inserted side end of the lens held in the second lens frame when the second lens frame is inserted from one of the openings into the first lens frame is engaged with the engaging part in the optical axis direction;
   a plate spring that is mounted in the first lens frame to be in contact with a non-inserted side end of the second lens frame opposite to the inserted side end and press the second lens frame toward the engaging part, the plate spring including a circular part which contacts to the non-inserted side end and a claw part which is outwardly projected in a diameter direction of the circular part from the circular part to be outwardly projected compared to the inner circumferential face of the first lens frame;
   a circumferential direction groove that is formed on the inner circumferential face of the first lens frame along the circumferential direction toward the outside of the diameter direction, and holds the plate spring mounted in the first lens frame in a manner that the claw part of the plate spring is fitted into the circumferential direction groove so that the plate spring is locked in the optical axis direction;
   a guiding groove that is formed at a position connected to a circumferential direction end of the circumferential direction groove on the inner circumferential face of the first lens frame in the optical axis direction, and guides the claw part of the plate spring inserted from the one of the openings of the first lens frame to a position where the claw part of the plate spring is fitted into the circumferential direction groove by rotation around the optical axis,
   a screw hole that penetrates from an outer circumferential face of the first lens frame to the inner circumferential face of the first lens frame at a position of the second lens frame fixed in the first lens frame in the diameter direction;
   a set screw that is screwed into the screw hole to be in contact with an outer circumferential face of the second lens frame and fix the second lens frame to the first lens frame in the direction orthogonal to the optical axis, an eccentricity adjustment for the lens held in the second lens frame is performed by adjusting an insertion amount of the set screw into the screw hole to adjust a fixing position of the second lens frame, and
   a tool insertion hole that is formed to penetrate from the outside of the fixed barrel to the screw hole, a tool for adjusting the insertion amount being inserted into the tool insertion hole.

2. The lens barrel having the eccentricity adjusting mechanism according to claim 1, wherein the screw hole is formed on at least three positions along the circumferential direction of the first lens frame.

3. The lens barrel having the eccentricity adjusting mechanism according to claim 1, wherein the circumferential direction groove is formed on a position intersecting with a plane surface including the position of the screw hole, among plane surfaces having the optical axis as their end sides.

4. The lens barrel having the eccentricity adjusting mechanism according to claim 1, wherein the lens group held in the first lens frame is positioned at the insertion opening side compared to the lenses held in the second lens frame, and has an aperture side lens having a larger diameter than the outer circumference of the second lens frame,
   the opening side lens is held at a position of an enlarged diameter inner circumferential face having an enlarged diameter compared to the inner circumferential face of the second lens frame in which the circumferential direction groove is formed, and
   the optical axis direction of the opening side lens is positioned by a wall surface of a step-difference portion between the inner circumferential surface, in which the second lens frame is contained and held, and the enlarged diameter inner circumferential face.

5. The lens barrel having the eccentricity adjusting mechanism according to claim 4, wherein the opening side lens is held in the first lens frame so that an interval ring is disposed between the opening side lens and the wall face.

6. The lens barrel having the eccentricity adjusting mechanism according to claim 1, wherein the lens group is a rear master lens group among optical systems disposed in the fixed barrel.

* * * * *